United States Patent Office 3,530,160
Patented Sept. 22, 1970

---

3,530,160
(ORGANO- OR HYDROLYZABLE GROUP SUBSTITUTED)₃SILYL (UNSUBSTITUTED CHLORO- OR SULFENYL CHLORIDE SUBSTITUTED HYDROCARBYLENE) SULFENYL CHLORIDES
Irwin J. Gardner, Fanwood, George E. Serniuk, Roselle, Francis P. Baldwin, Summit, and Thomas A. Manuel, Westfield, N.J., assignors to Esso Research and Engineering Company, a corporation of Delaware
No Drawing. Filed Feb. 9, 1968, Ser. No. 704,226
Int. Cl. C07f 7/02
U.S. Cl. 260—448.2    3 Claims

---

ABSTRACT OF THE DISCLOSURE

Reactive silyl group-containing sulfenyl halides are prepared by reacting hydrolyzable silanes containing unsaturated hydrocarbon radicals with sulfur dichloride; alternatively, the hydrolyzable silanes may be reacted with sulfur monochloride in the presence of a mild Lewis acid followed by halogenolysis. The reactive silyl group-containing sulfenyl halides may then be reacted with unsaturated polymers (e.g. copolymers of isobutylene and piperylene) to produce moisture-curable polymers.

---

SUMMARY OF INVENTION

Novel, reactive silyl group-containing sulfenyl halides are prepared by two methods. The first method involves the reaction of a hydrolyzable silane containing an unsaturated hydrocarbon radical with sulfur dichloride. The alternate method involves the reaction of these hydrolyzable silanes with sulfur monochloride so as to produce the bis-sulfur adduct and thereafter subjecting this adduct to halogenolysis with well known halogenolysis agents such as chlorine, bromine, sulfuryl chloride, dibromo tetrachloroethane, etc. The resultant novel, reactive silyl group-containing sulfenyl halides may then be reacted with an unsaturated polymer containing at least 0.5 mole percent unsaturation, thereby producing a polymer which is moisture-curable and which may therefore be cured at ambient temperatures upon exposure to atmospheric moisture or by exposure to moisture at higher temperatures, e.g. steam.

DETAILS OF THE INVENTION

The starting materials employed in the preparation of the novel, reactive silyl group-containing sulfenyl halides are hydrolyzable silanes containing unsaturated aliphatic or cycloaliphatic hydrocarbon radicals. These hydrolyzable silane starting materials may be characterized by the following formula:

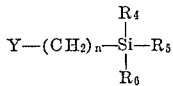

wherein Y is the unsaturated aliphatic or cycloaliphatic hydrocarbon radical, $n$ is an integer of 0 to 12, preferably 0 to 4, $R_4$ is a hydrolyzable group such as halogens (chlorine, bromine, iodine), $C_1$–$C_6$ alkoxy groups, $C_2$–$C_8$ acyloxy groups, an amino ($NH_2$) or amido ($NHR$, $NR_2$), group etc., and $R_5$ and $R_6$ are halogens or the same or different $C_1$–$C_6$ alkyl groups or hydrolyzable groups.

The hydrocarbon radical Y present on the hydroyzable silane starting materials may be one of three types:

(a) $C_2$–$C_8$ alkenyl radicals such as vinyl, propenyl, allyl, isobutenyl, hexenyl, etc.;

(b) $C_4$–$C_{12}$ cycloalkenyl and cycloalkadienyl groups such as cyclobutenyl, cyclopentadienyl, cyclohexadienyl, cyclohexenyl, dicyclopentenyl, bicyclopentenyl, etc.;

(c) $C_8$–$C_{16}$ alkenyl-aromatic radicals wherein the alkenyl moiety is the same as that noted previously for the alkenyl radicals.

Specific, nonlimiting examples of useful hydrolyzable silane starting materials are vinyl trichlorosilane, vinyl triacetoxysilane, allyl trichlorosilane, vinyl triethoxysilane, methylvinyldichlorosilane, hexenyltrichlorosilane, cyclopentenyltrichlorosilane, bicyclo(2.2.1) - 5 - heptene-3-trichlorosilane, bicyclo(2.2.1) - 5 - heptene-3-triacetoxy silane, cyclohexenyltrichlorosilane, etc.

The reactive silyl group-containing sulfenyl halides may be characterized by the formula:

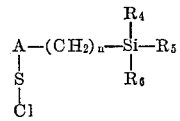

The methods for preparing the reactive silyl group-containing sulfenyl halides may be illustrated with the following specific equations:

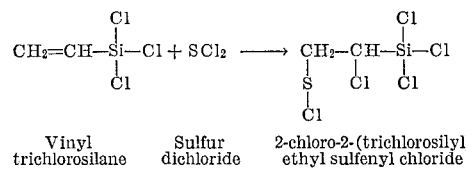

Vinyl          Sulfur          2-chloro-2-(trichlorosilyl)
trichlorosilane   dichloride      ethyl sulfenyl chloride In the alternate method for preparing the reactive silyl group-containing sulfenyl halides, the hydrolyzable silane starting material is reacted with sulfur monochloride in the presence of a mild Lewis acid such as $AlCl_3$, $FeCl_3$, $SnCl_4$, $TiCl_4$, $ZnCl_2$, etc. This reaction with sulfur monochloride produces the bis-sulfur adduct which must then be subjected to halogenolysis with a well-known halogenolysis agent such as chlorine, bromine, sulfuryl chloride, dibromo tetrachloroethane, etc.

The alternate method of preparing the reactive silyl group-containing sulfenyl halides may be illustrated by the following equation:

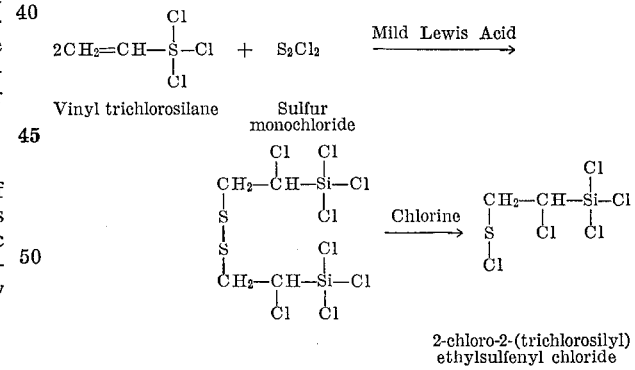

2-chloro-2-(trichlorosilyl)
ethylsulfenyl chloride

In practicing the first method for preparing the reactive silyl group-containing sulfenyl halides, the hydrolyzable silane starting material is admixed with 1 to 10, preferably 2 to 4 moles per mole of the $SCl_2$. As a matter of convenience, 25 to 300, preferably 25 to 200 parts by weight per 100 parts of $SCl_2$, of an inert diluent are added to the reactants. Suitable inert diluents, which may be aliphatic or aromatic hydrocarbons or their halogenated derivatives include carbon tetrachloride, chlorobenzene, dichlorobenzene, dichloroethane, methylene chloride, carbon disulfide, fluorotrichloro methane, etc. The reaction generally proceeds at room temperature or below, but if desired, the reaction mixture may be heated to about 35–50° C. to initiate the reaction. The reaction is exothermic in nature and is essentially complete within a period of 5 to 60 minutes after contact of the silane with sulfur dichloride. $SCl_2$ is removed from the reaction mixture by distillation before the product is used for the preparation of the moisture-curable polymer or the reactive silyl group-containing sulfenyl halide may also be recovered by removing both $SCl_2$ and the diluent through conventional distillation techniques.

In practicing the alternate method of preparing the reactive silyl group-containing sulfenyl halides, 0.4 to 0.6, preferably 0.5 mole per mole of the hydrolyzable silane starting material, of sulfur monochloride are employed. In addition, 0.25 to 5, preferably 0.5 to 1 part per 100 parts of sulfur monochloride, of the mild Lewis acid are employed; it is convenient to use an inert diluent of the type and amounts set forth above with respect to the first method for preparing the reactive silyl group-containing sulfenyl halides.

The first stage of the alternate reaction generally proceeds at room temperatures, although initiation of the reaction by heating to temperatures in the range of 35–50° C. may be desirable. The first stage of the alternate reaction is exothermic and is generally completed within 10 to 60 minutes. The reaction product obtained from the first stage of the alternate reaction is filtered to remove the Lewis acid and then subjected to halogenolysis with 0.5 to 4, preferably 0.5 to 1 mole per mole of silane, of a halogenolysis agent such as sulfuryl chloride. The halogenolysis reaction is generally carried out at temperatures in the range of −10 to 40° C. and is substantially complete within about 10 to 60 minutes. After completion of the halogenolysis reaction, the reaction mixture is distilled to remove excess halogenolysis agent and the reaction by-products and some or all of the solvent. The reaction product may then be used for the preparation of the moisture-curable polymer.

If desired, the hydrolyzable group or groups attached to the silicon atom in the reactive silyl group-containing sulfenyl halides, when such hydrolyzable groups are halogens, may be converted to the corresponding alkoxy groups or carboxy groups by reaction with alcohols or with alkali metal or organic based salts of carboxylic acids respectively. In addition, the —SCl moiety may be converted to —SOOCR, —SOR, —SSCN, —SNCS, etc. groups by treatment with a metal salt of a carboxylic acid, a metal alkoxide, a metal thiocyanate, a metal isothiocyanate, etc., respectively. Regardless of the reaction being employed, it is desirable to carry out the preparatory reactions as well as reactions leading to derivatives of the sulfenyl halides in an anhydrous atmosphere such as nitrogen, argon, etc., in order to avoid any premature hydrolysis or other inactivation of the sulfenyl halides prior to their use in the preparation of the moisture-curable polymers.

The sulfenyl halides (or their corresponding derivatives as set forth above) may then be utilized to prepare moisture-curable polymers by reaction with unsaturated polymers containing at least 0.5 mole percent unsaturation. The base polymers may have a number average molecular weight in the range of about 1,000 to 3,000,000 and an iodine number in the range of about 5 to about 475. In general, about 0.5 to about 50%, preferably 0.5 to 10%, by weight of the reactive silyl group-containing sulfenyl halide (or derivative thereof), based on the weight of the starting polymer, is employed. For the sake of convenience, 3 to 100, preferably 5 to 20 parts by weight, per part of the starting polymer of an inert aliphatic or aromatic or halogenated aliphatic or halogenated aromatic hydrocarbon diluent is employed to dissolve the starting polymer prior to its reaction with the sulfenyl halide (or derivative thereof).

The conversion of the starting polymer to a moisture-curable polymer is carried out by simply mixing the polymer, desirably dissolved in an inert diluent such as hexane, with the sulfenyl halide (or a derivative thereof) at temperatures in the range of about −10 to 50, preferably 15 to 35° C. The reaction is essentially completed after about 10 to 600 minutes and the moisture-curable polymer may then be recovered by merely stripping off the diluent and any excess sulfenyl halide or trace quantities of side products. In order to avoid any premature curing or degradation of the moisture-curable polymer, it is desirable to carry out the reaction of the starting polymer with the sulfenyl halide (or derivative thereof) in the presence of an anhydrous atmosphere such as argon, nitrogen, etc.

The starting polymer, as mentioned above, must be an unsaturated polymer containing at least 0.5 mole percent unsaturation. The type of unsaturation present in the polymer is not critical and thus polymers having any of Type I–V of unsaturation may be employed. Thus, the starting polymer may contain unsaturated monomeric units as follows:

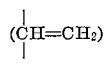

Type I such as in 1,2-addition polybutadiene;

$$-(CH=CH)-$$

Type II such as in 1,4-addition polybutadiene or copolymers of isobutylene with piperylene;

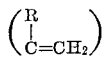

Type III

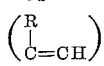

Type IV such as in polyisoprene;

Type V such as in poly-2,3-dimethylbutadiene.

Suitable nonlimiting examples of starting polymers include halogenated and unhalogenated copolymers of isobutylene with isoprene, halogenated and unhalogenated copolymers of isobutylene with piperylene, copolymers of styrene with butadiene, polybutadienes, polyisoprenes, halogenated and unhalogenated terpolymers of ethylene, propylene with a third monomer being a diene (i.e. known as "EPDM's"). Examples of the diene include 1,5-hexadiene, methylene norbornene, ethylidene norbornene, methyl tetrahydroindene, dicyclopentadiene, etc.

If desired, after the moisture-curable polymer has been prepared by reaction of the starting polymer with the sulfenyl halide (or derivatives thereof), it may be compounded with conventional fillers, plasticizers, processing oils, carbon black, antioxidants, etc. It is also desirable to insure stability of the moisture-curable polymer by blending the moisture-curable polymer with 1 to 10 moles per 1 mole of hydrolyzable group possessed by the silane adduct of the moisture-curable polymer, of a stabilizer having the formula:

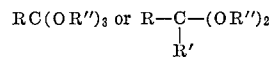

wherein R and R' are hydrogen or the same or different $C_1$–$C_4$ alkyl radicals and R'' is a $C_1$–$C_4$ alkyl radical. A particularly useful stabilizer is ethyl orthoformate.

Of course, the moisture-curable polymer may be utilized in any application wherein in situ curing is desired, e.g. mastics. In addition, the moisture-curable polymer may be converted to a latex by conventional methods, e.g. by subjecting the moisture-curable polymer in a hydrocarbon diluent (preferably containing a stabilizer of the type described above) to a water alcohol wash to remove acidic impurities, thereafter emulsifying the polymer, adjusting the pH to a level of 6 to 8, stripping off the diluent in water and adjusting the pH to a level of 4 to 7 during stripping so as to obtain the latex product.

This invention may be illustrated by reference to the following examples.

Example 1

Vinyl trichlorosilane, 16.15 g., was slowly added over a period of two hours to a solution of 10.85 g. of sulfur dichloride in 100 ml. of methylene chloride (previously dried by molecular sieves) at 0° C. After all of the vinyl trichlorosilane was added, the reactants were contacted for an additional hour. 90 ml. of the resultant solution (containing 2-chloro-2-(trichlorosilyl) ethyl sulfenyl chloride) was added to 1500 ml. of a hexane cement containing 150 g. of a copolymer of isobutylene and piperylene; this copolymer had a viscosity average molecular weight of 266,000 and an unsaturation level of 2.26 mole percent. The materials were allowed to remain in contact overnight at 22° C. and a sample of the resultant reaction product was recovered by removal of the hexane. This sample when cured in a humidity cabinet at 66° C. and 67% relative humidity showed a 100% insolubility and a 370 wt. percent increase in cyclohexane indicating a significant amount of crosslinking, i.e. curing, had occurred. After four days, the original cement gelled.

Example 2

Vinyl triacetoxy silane, 23.23 g., was added over a period of two hours to 10.8 g. of sulfur dichloride in 50 ml. of molecular sieve-dried methylene dichloride to form 2-chloro-2-(triacetoxy silyl) ethyl sulfenyl chloride. 130 ml. of the resultant reaction mixture was added to 1500 ml. of a hexane cement containing 150 g. of the copolymer described in Example 1. The moisture-curable polymer (recovered by removal of the diluent) when air cured at room temperature for 168 hours was 91% insoluble and showed a wt. percent increase in cyclohexane of 897%. When another sample of the moisture-curable polymer was cured for 168 hours in a humidity cabinet at 66° C. and 67% relative humidity, the product exhibited a 95% insolubility and a wt. percent gain of 829% in cyclohexane.

Example 3

Example 1 was repeated and the reaction mixture obtained after the addition of vinyl trichlorosilane to the sulfur dichloride was subjected to distillation at 2.5 mm. Hg pressure to remove the diluent and excess sulfur dichloride. To this reaction mixture was then added 11.8 g. of sulfuryl chloride in 50 ml. methylene dichloride at 10° C. and the resultant mixture was stirred for 30 minutes at 25 to 30° C. The diluent, excess sulfuryl chloride and sulfur dioxide were distilled off under reduced pressure and a yield of 2-chloro-2-(trichlorosilyl) ethyl sulfenyl chloride in the amount of 75% of the theoretical yield was obtained. This example illustrates the advantage in using a halogenolysis agent such as sulfuryl chloride to assure the conversion of any sulfur monochloride to sulfur dichloride and any 2-chloro-2-(trichlorosilyl) ethyl disulfide to the corresponding sulfenyl chloride.

Example 4

Vinyl trichlorosilane, 32.3 g., was reacted with 13.5 g. of sulfur monochloride in the presence of 0.3 g. anhydrous ferric chloride. The reaction mixture was heated to 40° C. to initiate the reaction. One-half hour after the exotherm, the reaction mixture was allowed to cool to room temperature in a nitrogen atmosphere and was then filtered in a nitrogen dry-box to remove the ferric chloride and the filtrate was diluted with carbon tetrachloride. To the filtrate was added 15 g. of sulfuryl chloride to effect chlorinolysis of the disulfide intermediate. The chlorinolysis reaction was initiated at a temperature of 10° C. and completed at room temperature. After completion of the evolution of $SO_2$, the solvent and excess sulfuryl chloride and residual $SO_2$ were removed from the product by distillation under reduced pressure. The product had a yellow-brownish color, it was viscous and malodorous.

Example 5

40 g. of butyl rubber having a number average molecular weight of 9842 and an iodine number of 28.0 (4.16 mole percent unsaturation) was dissolved in 150 ml. of hexane and this cement was thereafter treated with 8.3 g. of the sulfenyl halide obtained from Example 4. The reaction mixture was allowed to stand in a nitrogen drybox overnight and a portion of the resultant product was cast upon aluminum and the solvent allowed to evaporate in a nitrogen atmosphere. Upon exposure of the polymeric film to the atmosphere for several hours, the film become crosslinked as evidenced by its increased tensile strength and insolubility in hexane.

Example 6

In this example, 2-chloro-2-(trichlorosilyl) ethyl sulfenyl chloride as prepared in Example 4 was reacted with an ethylene-propylene-methylene norbornene terpolymer which had the following characteristics: ethylene—75.3 wt. percent; propylene—22 wt. percent; and methylene norbornene—2.7 wt. percent; intrinsic viscosity of this terpolymer was 3.3 and it had a $MLR_{260}$ of 54 (i.e. Mooney viscosity of raw polymer measured at 260° F. using standard large rotor).

To 1154 g. of a 7.5 wt. percent hexane cement of this terpolymer were added 5.4 g. of the ethyl sulfenyl halide obtained from Example 3. The materials were contacted overnight at 25° C.; the utilization of the sulfenyl halide by titration was found to be 39.4%. A sample of the polymeric product when cured in a humidity cabinet at 66° C. and 67% relative humidity for 264 hours gave the following results: Percent insolubles—93.6; percent wt. increase in hexane—427. Another sample of the polymeric product when cured in the air for 264 hours showed insolubles of 89.5% and a wt. increase in hexane of 885%.

Example 7

A hexane cement (2291 g.) containing 542 g. of a copolymer of isobutylene and piperylene having the properties set forth in Example 1 was treated with 56 g. of the sulfenyl chloride (prepared in the method described in Example 4) dissolved in 600 ml. of hexane for 17.5 hours at 26° C. and thereafter for two hours at 40° C. An air-cured sample of the resultant polymeric product showed 95.1% insolubles and a 1108 wt. percent increase in hexane.

Example 8

A hexane cement (8641 g.) containing 648 g. of the terpolymer described in Example 6 was treated with 42.8 g. of the sulfenyl chloride (prepared as described in Example 4) for 5 days at 25° C. and thereafter for two hours at 40° C. The bulk of the polymeric product was treated with 0.45 mole of a molecular sieve-dried 2-ethyl hexanol (58 g.) and the reaction mixture was heated to 67° C. to promote alcoholysis and to drive off HCl. The alcohol treated and untreated samples of the polymeric product showed the following cure properties:

| Sample | Air cured, wt. percent | | Oven cured, wt. percent | |
| --- | --- | --- | --- | --- |
| | Insoluble | Gain in hexane | Insoluble | Gain in hexane |
| Alcohol treated | 72 | 2,380 | 86 | 1089 |
| Untreated | 68.2 | 3,400 | 84.6 | 1078 |

Example 9

The sulfenyl chloride (24.2 g.) prepared as described in Example 3 was reacted with 4,000 ml. of a 9.51 w./v. percent hexane cement of butyl rubber having a 1.8 mole percent unsaturation. Samples of the polymeric product were removed at various intervals and the wt. percent increase in cyclohexane was determined for the products which were cured in a humidity cabinet at 66° C. and 67% relative humidity.

TABLE I

| Sample taken at hours.. | Percent insoluble/weight | | Percent increase in cyclohexane | |
|---|---|---|---|---|
| | 1 | 2 | 3 | 15 |
| Cure time, hours: | | | | |
| 0 | 89.4/813 | 90.8/678 | 91.3/748 | 96.7/781 |
| 5 | 94.8/886 | 96.4/743 | 95.8/776 | 101/718 |
| 76 | 100/823 | 103/621 | 103/750 | 98.3/652 |
| 168 | | | 99.7/685 | 91.4/597 |

Example 10

A hexane cement (2 liters) having a 20 w./v. percent content of a copolymer of isobutylene and piperylene (having the properties as described in Example 1) was diluted with two additional liters of hexane and to this solution was added 31.9 g. of the sulfenyl halide (prepared as described in Example 3). The reaction mixture moved after the intervals of time shown in Table II below. The data obtained after curing the polymeric products in a humidity cabinet at 66° C. and 67% relative humidity are shown in Table II.

TABLE II

| Sample taken at hours.. | Percent insoluble/weight | | Percent increase in cyclohexane | |
|---|---|---|---|---|
| | 1 | 2 | 3 | 15 |
| Cure time, hours: | | | | |
| 0 | 92.6/721 | 92.9/580 | 92.7/524 | 97.2/494 |
| 5 | 96.3/776 | 97.6/771 | 97.2/658 | 102/550 |
| 76 | 98.5/869 | 101/711 | 103/675 | 99/626 |
| 168 | | | 99.4/601 | 95.1/572 |

The bulk of the polymeric product prepared above was subjected to alcoholysis with dried isopropyl alcohol and the thus treated polymeric product showed the following percent insolubles/weight percent gain in cyclohexane after curing in air at room temperature in the humidity cabinet at 66° C. and 67% relative humidity.

TABLE III

| | Air cure | Humidity cabinet cure |
|---|---|---|
| Cure time, hrs.: | | |
| 0 | 64.1/3820 | |
| 1 | | 91.6/1245 |
| 7 | | 94.6/820 |
| 25 | | 97.9/517 |
| 54 | 77.7/2123 | |
| 121 | | 99.2/503 |
| 144 | 89.1/1240 | 93.5/523 |
| 168 | 90.3/1112 | |

TABLE IV

Compound: Alcohol Treated Polymer–100, Black–50 phr.

| | Cure 8 days at R.T.: Tensile, p.s.i./elongation, percent | Cure 1 hr. at 66° C./67% rel.h.: Tensile, p.s.i./elongation, percent |
|---|---|---|
| Carbon blacks: | | |
| MT | 503/600 | |
| SRF | 1003/683 | |
| HMF | 1313/633 | |
| HAF | 1871/573 | |
| FT | 2282/533 | |
| MT | | 1487/600 |

Example 11

Butyl rubber having a viscosity average molecular weight of 383,000 and an iodine number of 13.5 was reacted with a sulfenyl halide in the manner described in Example 5; the molar ratio of sulfenyl halide to polymer unsaturation was 0.70. Aliquot samples of the resultant reaction product (125 ml. samples containing 11.8 g. of polymeric product and unreacted sulfenyl halide) were treated with the materials listed in Table V. A molar ratio of the base (or alcohl or base plus alcohol) to chloride of 1.25:1 was employed based on the cement's original sulfenyl hydrolyzable halide content and moisture-free conditions were maintained throughout the experiment. The time to gelation for the various systems is shown in Table V. In Table VI, the results of a cure study are given wherein portions of the cement were evaporated, dried under vacuum and pressed micropads were then cured either in air at room temperatures or in a humidity cabinet (66° C. and 67% relative humidity). The percent insolubles and the percent weight increase in cyclohexane were determined after immersion after 48 hours at room temperature.

TABLE V.—GELATION TIME FOR VARIOUS STABILIZING SYSTEMS

| Run No. | Stabilizer system | Time to gelation, hrs. | Comments |
|---|---|---|---|
| A | Pyridine | 288+ | Dirty yellow ppt., opaque-bad odor. |
| B | Pyridine plus isopropyl alcohol. | 288+ | Dirty tan color, opaque-bad odor. |
| C | Pyridine plus ethyl alcohol. | 288+ | Do. |
| D | Triethanolamine + isopropyl alcohol. | 144 | Base not soluble; caused polymer to ppt. in part. |
| E | Triethylorthoformate (TEOF). | 288+ | Clear, light yellow, very fluid. |
| F | Dipentene | 42 | Clear, light yellow. |
| G | Anhydrous CaCO₃ | 42 | White suspension. |
| H | Control | 18 | Clear, light yellow to colorless. |
| I | Phenylbetanaphthylamine. | 42 | Dark green ppt.; opaque; bad odor. |
| J | Isopropyl alcohol control. | 1 | Clear, light yellow. |
| K | TEOF plus isopropyl alcohol. | 264 | Clear, light yellow fluid. |

TABLE VI.—EFFECTIVE OF STABILIZING SYSTEMS ON CURE RATE

| Run No. | A | B | C | D | E | I | K |
|---|---|---|---|---|---|---|---|
| Cure time, hrs | 65 | 65 | 65 | 65 | 65 | 21 | 4 |
| Percent insolubles/percent wt. increase (Humidity cabinet) | 99.5/506 | 63.5/5000 | 84.0/1427 | 95.0/553 | 98.8/546 | 90.4/830 | 92.2/857 |
| Percent insolubles/percent wt. increase (Air) | 91.2/799 | Dissolved | Dissolved | 64.0/4100 | 71.8/2488 | 83.7/1000 | |
| Pad appearance | (1) | (2) | (2) | (3) | (4) | (5) | (4) |
| Cure time, hrs | 91 | 91 | 91 | 91 | 91 | | 26 |
| Percent insolubles/percent wt. increase (Humidity cabinet) | 94.1/535 | 74.3/2563 | 86.2/986 | 100/480 | 96.8/516 | | 94.8/647 |
| Percent insolubles/percent wt. increase (Air) | 93.3/603 | Dissolved | Dissolved | 84.7/2795 | 84.2/1926 | | |

¹ Dark, crumbly.   ² Tan, smooth.   ³ Clear, wrinkled.   ⁴ Clear, smooth.   ⁵ Green, wrinkled.

A portion of the alcohol-treated polymer prepared as described above was compounded with various types of carbon blacks, cured and the tensile and elongations were determined. The results are shown in Table IV.

Example 12

Triethylorthoformate (10 g.) was added to one liter of a hexane cement (10 w./v. percent) of the alcohol-treated polymeric product prepared in Example 10; the polymer product was then dried under a nitrogen atmosphere at reduced pressure. The resultant polymer product was then compounded with a SRF carbon black (50 phr. level of carbon black) on an open mill. Micropads were pressed (0.035 in.) and the rate of cure determined as a function of the cured product's insolubles and wt. percent increase in cyclohexane. Table VII presents the results of this experiment.

TABLE VII.—RETARDATION OF CURE OF ALCOHOL-TREATED POLYMER

| | PRODUCT 66-044A-120, 122 | | | |
|---|---|---|---|---|
| System | Cure time and temp. | Tensile, p.s.i./ elongation, percent | Percent insolubles | Percent wt. increase |
| 66-0433-76B no TEOF | 8 days in air | 1,003/683 | 94.8 | 716 |
| —76B+TEOF | 24 hrs. in humidity cabinet | 1,487/600 | 96.7 | 246 |
| 76B+TEOF | 3 hrs. in air | 81/1,400+ | 15.0 | 6,970 |
| | 2 days in air | 122/1,400+ | | |
| | 4 days in air | 142/1,400+ | 28.2 | 3,800 |
| | 7 days in air | 293/1,100 | 41.6 | 2,349 |
| | 9 days in air | 400/1,050 | | |
| | 11 days in air | 649/900 | | |
| | 14 days in air | 750/850 | | |

What is claimed is:
1. A reactive silyl group-containing sulfenyl chloride having the formula:

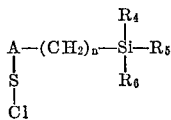

wherein $n$ is an integer of 0 to 12, $R_4$ is a hydrolyzable group, $R_5$ and $R_6$ are the same or different $C_1$–$C_6$ alkyl groups or hydrolyzable groups and A is selected from the group consisting of:
(a)

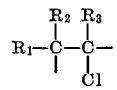

wherein $R_1$, $R_2$ and $R_3$ are the same or different hydrogen atoms or $C_1$–$C_6$ alkyl groups, (b)

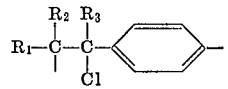

wherein $R_1$, $R_2$ and $R_3$ are substituents as defined in (a),
(c) a $C_4$–$C_{12}$ cycloalkane group containing a chlorine atom on the carbon atom adjacent to the carbon atom which contains the —S—Cl group,
(d) a $C_4$–$C_{12}$ cycloalkenyl group containing a chlorine atom on the carbon atom adjacent to the carbon atom which contains the —S—Cl group.

2. The sulfenyl halide of claim 1 which is 2-chloro-2-(trichlorosilyl) ethyl sulfenyl chloride.
3. The sulfenyl halide of claim 1 which is 2-chloro-2-(triacetoxysilyl) ethyl sulfenyl chloride.

References Cited
UNITED STATES PATENTS
3,278,484  10/1966  Tesoro _____ 260—448.2 X TOBIAS E. LEVOW, Primary Examiner W. F. W. BELLAMY, Assistant Examiner U.S. Cl. X.R.
260—45.7, 79.5, 448.8